United States Patent [19]

Shecter

[11] Patent Number: 5,681,200
[45] Date of Patent: Oct. 28, 1997

[54] TOY TELEPHONE WITH INTEGRAL LOLLIPOP HOLDER

[76] Inventor: Jules Shecter, 3301 Harrington Dr., Boca Raton, Fla. 33496

[21] Appl. No.: 665,411

[22] Filed: Jun. 18, 1996

[51] Int. Cl.$^6$ .............. A63H 5/00; A63H 33/30; A23G 1/00; A21D 10/02
[52] U.S. Cl. .............. 446/76; 446/81; 446/142; 446/408; 426/104; 426/112; 426/115; 426/134
[58] Field of Search .................. 446/141, 142, 446/143, 71, 75, 76, 81, 404, 408, 485; 426/10.4, 112, 115, 134

[56] References Cited

U.S. PATENT DOCUMENTS

| | | |
|---|---|---|
| D. 161,595 | 1/1951 | Rubin et al. . |
| D. 288,140 | 2/1987 | Fontlladosa . |
| D. 313,689 | 1/1991 | Epstein . |
| D. 320,300 | 10/1991 | Good et al. . |
| D. 323,417 | 1/1992 | Cacia . |
| D. 346,475 | 5/1994 | Bierend . |
| D. 353,031 | 12/1994 | Pope . |
| D. 353,064 | 12/1994 | Gilbert . |
| 1,567,284 | 12/1925 | Miller . |
| 2,162,224 | 6/1939 | Legge .................. 426/115 X |
| 2,379,981 | 7/1945 | Millstein .................. 426/104 |
| 2,417,480 | 3/1947 | Friedman . |
| 2,590,476 | 3/1952 | Stough .................. 446/141 X |
| 2,617,324 | 11/1952 | Brody . |
| 2,739,065 | 3/1956 | Hugin . |
| 3,459,296 | 8/1969 | Berg .................. 426/115 X |
| 3,636,654 | 1/1972 | Workman .................. 446/408 |
| 4,229,482 | 10/1980 | Kreake, Jr. . |
| 4,902,519 | 2/1990 | Ream et al. . |
| 4,914,748 | 4/1990 | Schlotter, IV et al. . |
| 4,973,285 | 11/1990 | Diotte .................. 446/142 X |
| 5,066,502 | 11/1991 | Eales . |
| 5,209,692 | 5/1993 | Coleman et al. .................. 446/144 X |
| 5,370,884 | 12/1994 | Coleman .................. 426/134 X |
| 5,391,107 | 2/1995 | Coleman .................. 446/71 X |
| 5,458,277 | 10/1995 | Wyzykowski . |
| 5,471,373 | 11/1995 | Coleman et al. . |
| 5,484,602 | 1/1996 | Stanley et al. . |
| 5,503,857 | 4/1996 | Coleman et al. .................. 426/134 X |
| 5,536,054 | 7/1996 | Liaw .................. 426/134 X |

*Primary Examiner*—Mickey Yu
*Assistant Examiner*—D. Neal Muir
*Attorney, Agent, or Firm*—John C. Smith

[57] ABSTRACT

A toy telephone which has an integral lollipop holder. The toy telephone has a voice recorder which can be used by a child to record and play back messages for amusement. A lollipop is removably attached to a retractable slide which extends the lollipop for consumption and retracts the lollipop into the toy telephone for storage. During storage, the lollipop is enclosed within the telephone to prevent the lollipop from being contaminated. The lollipop is optionally formed in the shape of an antenna. The data keys of the telephone can be optionally illuminated to simulate a real telephone. The audio data and record function can be replaced or used in conjunction with a radio. Optionally, preselected sounds can be stored such as telephone tone dialing sounds or telephone ringing sounds.

20 Claims, 8 Drawing Sheets

TOY TELEPHONE WITH INTEGRAL LOLLIPOP HOLDER

BACKGROUND OF THE INVENTION

1. Technical Field

The present invention relates to novelty items for use with confectionary products. In particular, it relates to a lollipop holder integrated with a toy telephone device which holds a replaceable lollipop that can be retracted into an enclosed storage area. The lollipop can be formed in the shape of an antenna, and the holder, which is shaped like a telephone, contains an audio recorder which allows a child to record a message and play it back.

2. Background Art

Lollipops have been a popular confectionary item for many years. This type of candy is popular for many reasons, including taste, portability, resistance to spoilage, etc. Prior art devices have been invented which provide features that can be used to make consumption of lollipops more enjoyable or to allow lollipops to be used for other purposes.

For example, musical lollipops are known which are constructed in the form of a flute or whistle such that the candy which forms the lollipop itself can produce sounds. Of course, as the lollipop is consumed its shape changes and the ability to use it as a whistle or flute is lost. Lollipop holders capable of producing prerecorded sounds are also known. Typically, sound producing lollipops or lollipop holders are designed to provide amusement to the consumer by playing a prerecorded sound.

Lighting devices and/or light emitting pops are also known. Typically, a light emission device would be integrated into a lollipop holder assembly such that the handle could be turned on to produce light when desired. As was the case with sound producing items, the use of light mechanisms in conjunction with a lollipop is typically done for amusement purposes.

Non-entertainment forms of lollipops have also been developed. For example, another use for lollipops has been as an alternative to traditional ingestion techniques for medicine. By ingesting medicine via medicated lollipops, children and disabled adults can be administered does of medicine in a more convenient manner.

As can be seen from the foregoing, a variety of devices and lollipops have been developed to suit both entertainment and practical needs. However, while there are many devices related to lollipops, the devices do not address a particular problem which is caused by the long period of time it takes to consume a lollipop. In particular, lollipops last a long time and because of this they tend to be consumed incrementally. Between consumption sessions, the user is faced with the problem of what to do with the lollipop which is sticky and tends to adhere to dirt and be susceptible to biological contamination. This is especially troublesome for children who by their nature will be more haphazard than adults when handling lollipops.

There are known containers which are designed as a case for holding a lollipop. For example, one known container is worn around the consumers neck similar to a necklace. Disadvantages to this approach are the inconvenience of carrying the device in this manner. Further, since the lollipop is loose within the outer shell of the device, the inside surface of the shell can become sticky and inconvenient to handle. Due to the purely practical nature of this approach, it would not be attractive to children. It would be desirable to have a lollipop holder which overcame the disadvantages of messiness and inconvenient methods of transport common to this device by providing a method of storing a lollipop without getting the consumers fingers sticky and also by providing a method of storage which is attractive to children such that they would be likely to use it. While it is possible to manufacture a sanitary case for storing lollipops between uses, children would be more likely to use a sanitary case if it was formed as a toy as well as a practical container.

Prior lollipop devices use a single pop having a single flavor. If a consumer desired to have more than one flavor, multiple lollipops would have to be carried. Likewise, a parent with more than one child would have to carry multiple lollipops, one for each child, resulting in an inconvenient and messy collection of candy which would have to be discarded or stored between uses.

The prior art has failed to provide a lollipop holder device which provides a clean holder for a replaceable lollipop, which can be used as an amusement device, and which further has a convenient storage compartment that is available when consumption of the lollipop is interrupted.

SUMMARY OF THE INVENTION

The present invention solves the foregoing problems by providing a toy telephone which has an integral lollipop holder. The toy telephone has a voice recorder which can be used by a child to record and play back messages for amusement. A lollipop stick is removably attached to a retractable slide which extends the lollipop for consumption and retracts the lollipop into the toy telephone for storage. During storage, the lollipop is enclosed within the telephone to prevent the lollipop from being contaminated. The lollipop is preferably formed in the shape of an antenna. The data keys of the telephone can be optionally illuminated to simulate a real telephone.

DESCRIPTION OF THE PREFERRED EMBODIMENT

Figure 1:
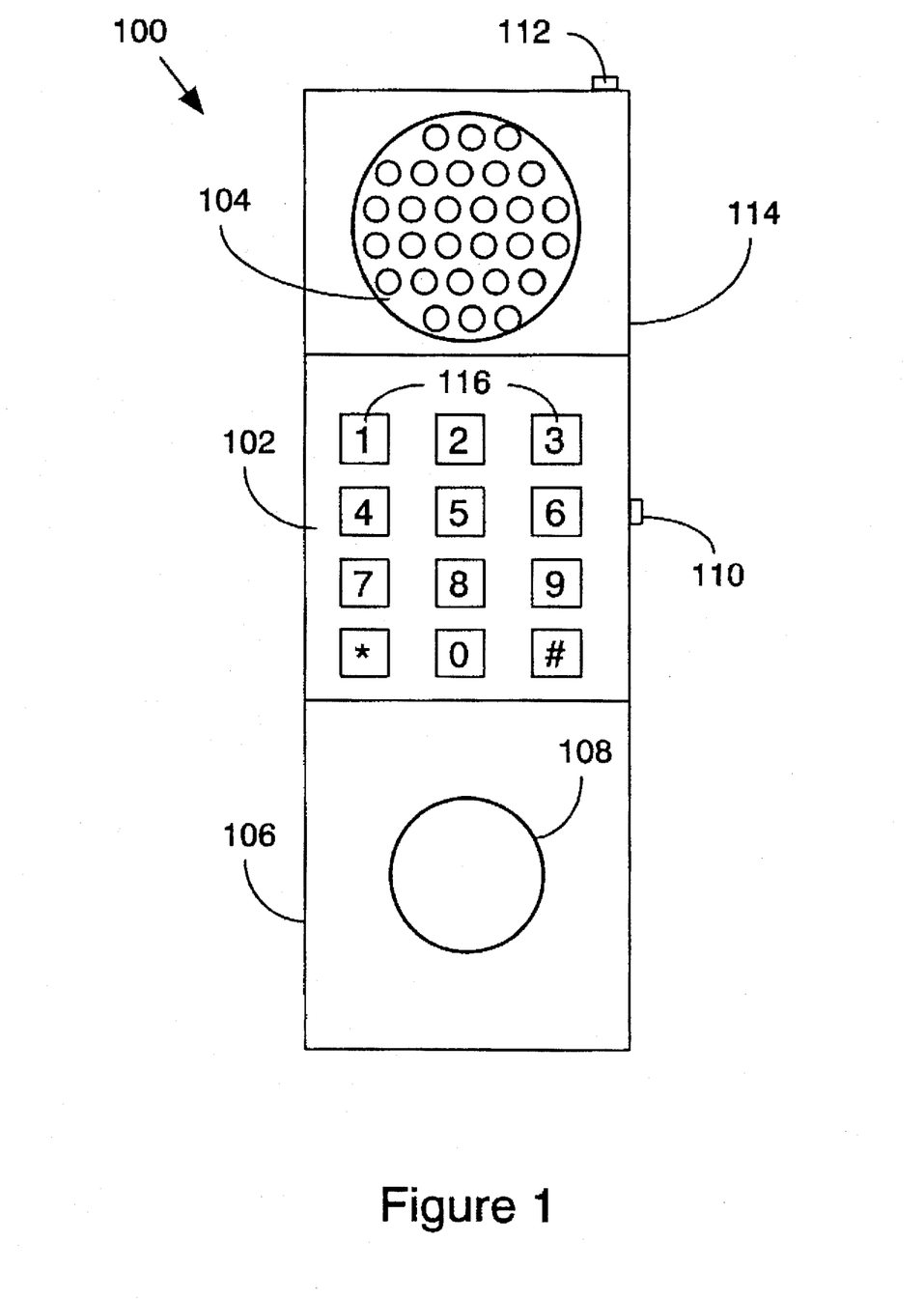
FIG. 1 is a front view of a preferred embodiment which illustrates the toy telephone with the lollipop in the retracted (or storage) position.

Referring to FIG. 1, this figure shows a front view of toy lollipop holder 100 (hereinafter holder 100). This view shows a central keypad section 102 which contains a set of keys 116 typically found on a telephone. The keys can be actual keys or merely indicia imprinted or adhered to the surface of central keypad section 102. Alternatively, keys 116 can be illuminable to provide a more realistic appearance and a more enjoyable experience for the child.

Lower microphone section 106 is shown with microphone port 108. Microphone port 108 can be any convenient size to allow use of an internal microphone. In the preferred embodiment, microphone 504 (shown in FIG. 5A) is activated by pressing one of the keys on central keypad section 102. Alternatively, microphone 504 can be automatically activated when slide knob 110 is moved up to the extended position.

Figure 5A:
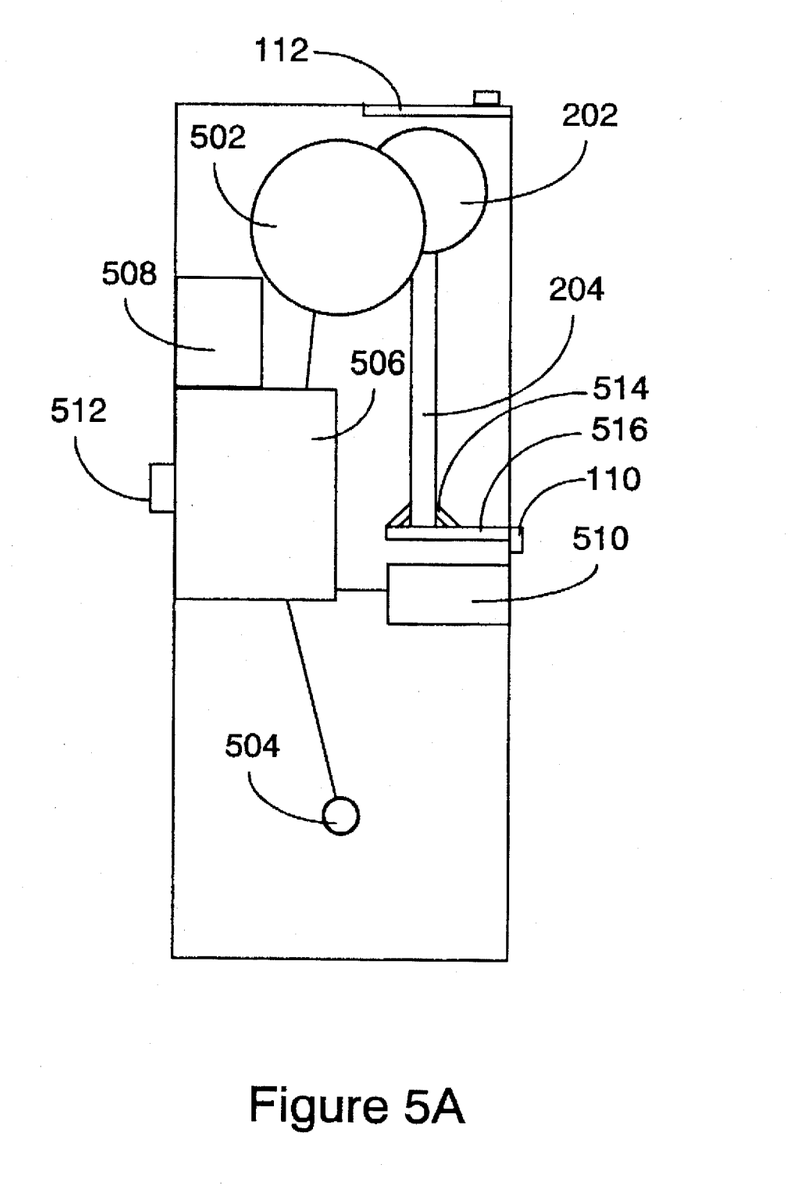
FIG. 5A is a cutaway front view illustrating the electronic components, the lollipop and the lollipop slide.

Upper speaker section 114 contains speaker port 104. When holder 100 completes recording of a message, it can be played back via speaker 502 (shown in FIG. 5).

This view illustrates holder 100 with the lollipop 202 (shown in FIG. 2) in the retracted position. Slide knob 110 is shown protruding from the side of holder 100. When the user decides to move lollipop 202 to the extended position, cover 112 is moved to the open position (illustrated in FIG. 4), and the lollipop is extended by pushing slide knob 110 toward upper speaker section 114.

In the preferred embodiment, holder 100 is molded from plastic due to its advantages of low cost and ability to provide a relatively sanitary lollipop storage environment. Those skilled in the art will recognize that any suitable material can be used to fabricate holder 100. For example, a disposable version may be fabricated from plastic, cardboard, etc. Of course, a reusable holder 100 could also be fabricated from appropriate materials (i.e., those which can be cleaned between uses) such as plastic, metal, etc.

Between lollipop 202 uses, holder 100 provides a sanitary storage compartment to store the lollipop 202 until the next use. An advantage of holder 100 is that it allows a child to store a lollipop in a sanitary storage compartment between uses. Further, the ability of a child to use the device as a toy encourages its use.

Figure 2:
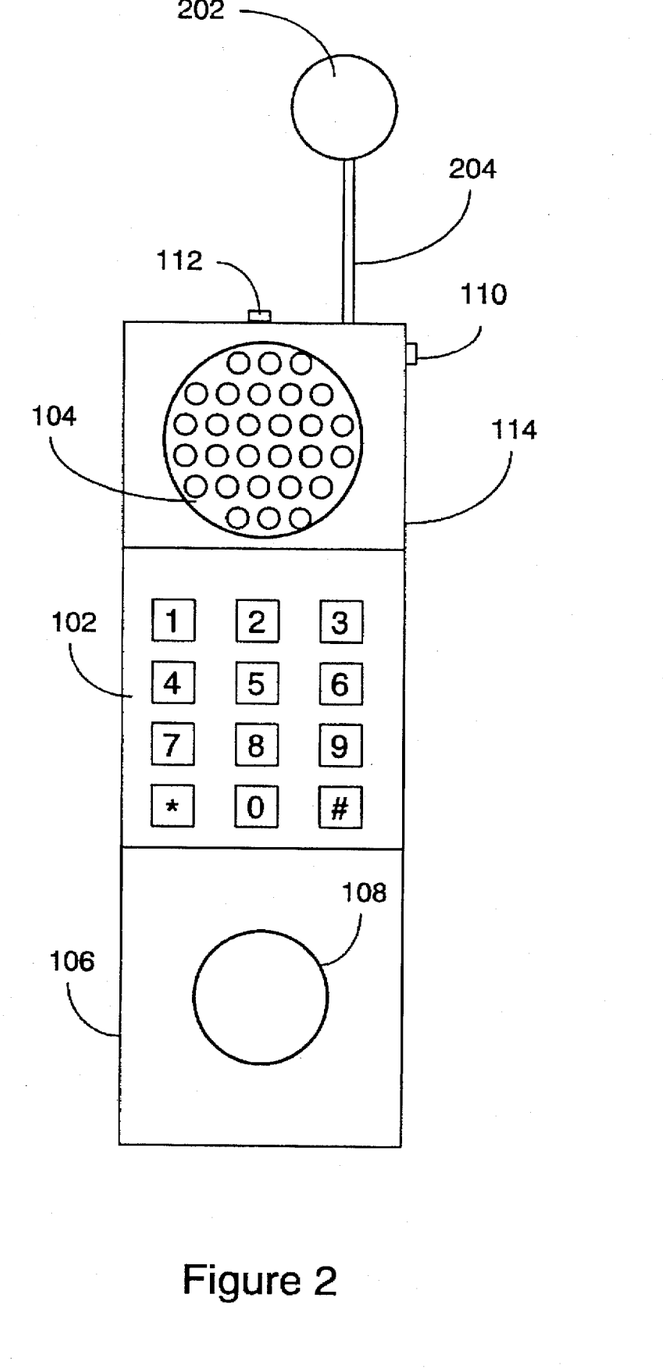
FIG. 2 is a front view of a preferred embodiment which illustrates the toy telephone with the lollipop in the extended (or consumption) position.

FIG. 2 shows the embodiment of FIG. 1 with lollipop 202 in the extended position. In this figure, cover 112 is moved to the open position and slide knob 110 is moved to the extended position (toward the upper speaker section 114). When Slide knob 110 is attached to lollipop stick 204 such that when slide knob 110 is advanced, it pushes lollipop 202 out of holder 100 and into the extended position. In this figure, lollipop 202 is shown in the shape of a conventional sucker. However, lollipop 202 can be formed in any desirable shape. In a preferred embodiment, lollipop 202 is shaped like an antenna.

Figure 3:
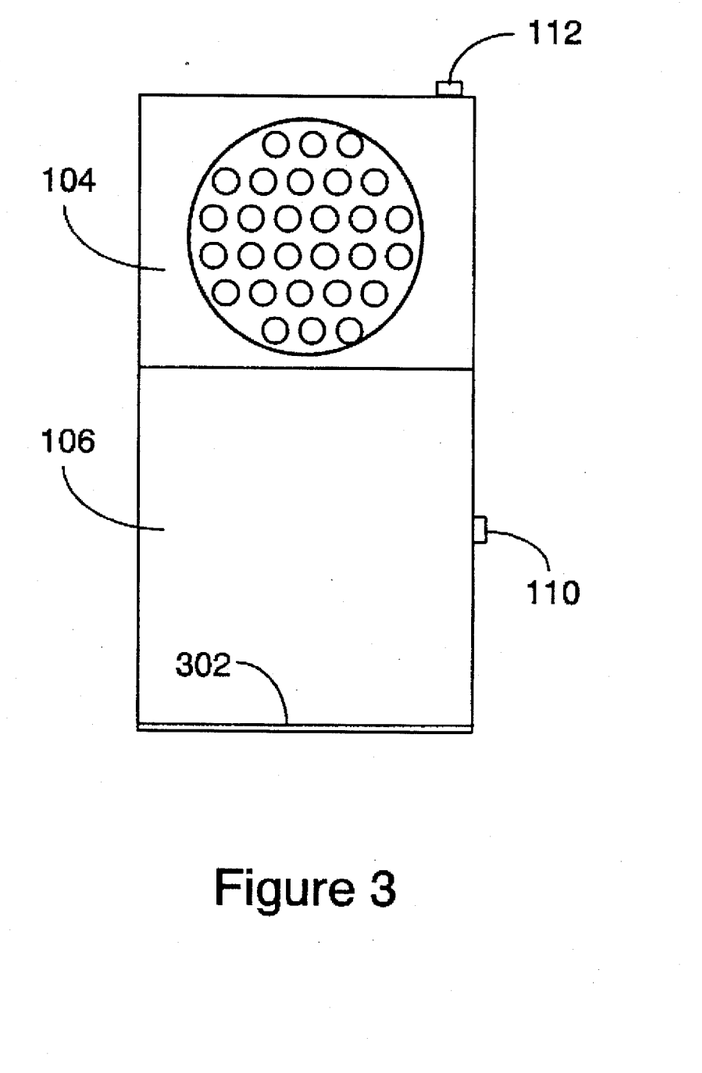
FIG. 3 is a front view of an alternative preferred embodiment which illustrates the toy telephone with the lollipop in the retracted (or storage) position. This embodiment illustrates an optional folding microphone.

FIG. 3 shows an alternative embodiment in which lower microphone section 106 is attached to central keypad section 102 via a hinge 302. The purpose of the hinge 302 is to allow lower microphone section 106 to fold on top of central keypad section 102 in the same manner as a real telephone, further enhancing the play capability of holder 100 for children.

Figure 4:
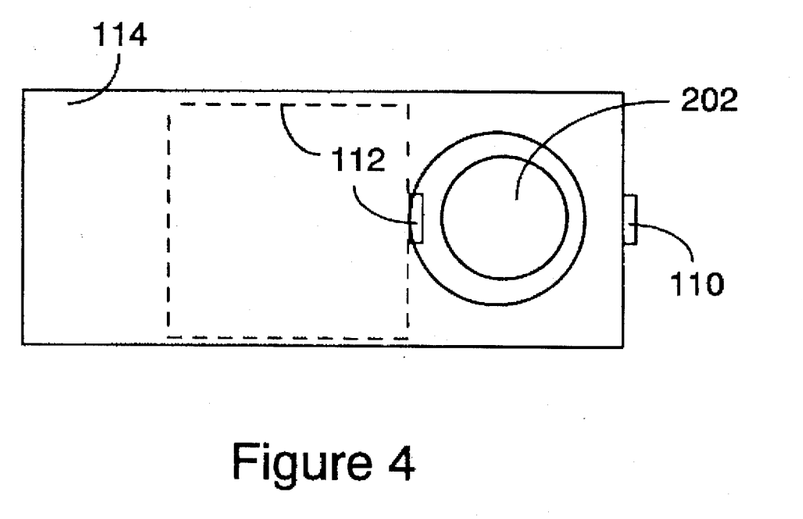
FIG. 4 is a top view showing a lollipop in the retracted position. A sliding cover is shown in the open position.

FIG. 4 shows a top view of holder 100. Slide button 110 is shown on the side of holder 100. Cover 112 is shown moved to the open position, exposing lollipop 202. By pushing slide knob 110 up, lollipop 202 can be moved out of holder 100 into the extended position. Methods of attaching sliding covers such as cover 112 to support structures are well known in the art. As can be seen in this view, upper speaker section 114 must have sufficient thickness to accommodate lollipop 202. Therefore, flat lollipops will allow a more compact structure. The antenna shaped lollipop (shown in FIG. 7) is similar to a flat lollipop in that it permits a shallow depth for upper speaker section 114.

In FIG. 5A, a cutaway front view of holder 100 is shown. The lollipop stick 204 is held by stem grasper 514. Lollipop 202 can be secured to stem grasper 514 by adhesive, pressure fit, threads on the inner wall of stem grasper 514, etc. Stem support 516 provides the structural support for stem grasper 514 and is attached to slide button 110 as shown. If a user finishes a lollipop and wishes to insert a new one, then the retractable securing attachment is moved to the extended position, the old lollipop 202 and lollipop stick 204 are removed, and a new lollipop 202 and lollipop stick 204 are inserted into stem grasper 514.

In this figure, lollipop 202 is shown in the retracted position. Cover 112 is moved to the closed position. As can be seen, the lollipop 202 is protected from exposure to contaminants in this position. Also seen in this figure is record/play switch 512 and audio controller 506. Audio controller 506 controls data memory 508, speaker 502 and microphone 504. In the preferred embodiment, audio controller includes circuitry necessary to receive analog audio data from microphone 504, an analog to digital (A/D) converter and associated circuitry to convert and store data into data memory 508, a digital to analog (D/A) converter and associated circuitry to retrieve digital data and convert it to audio data, and an amplifier to amplify the audio data and play it on speaker 502. A/D converters, D/A converters, and amplifiers are well known in the art. Battery 510 is attached to audio controller 506 and provides power for operation of the device.

In the preferred embodiment, data memory 508 is a digital audio memory device. Digital audio memory is well known in the art and commercially available from numerous vendors. Those skilled in the art will recognize that alternative memory technologies, such as magnetic tape, can be implemented. However, these technologies have the disadvantages associated with any device that has moving parts.

In the preferred embodiment, when a child depresses switch 512, audio controller 506 activates microphone 504. Audio data from microphone 504 is input into audio controller 506 where it is converted to digital data and stored in data memory 508. When the child releases switch 512, audio controller 506 reads the digital audio data stored in data memory 508, converts it to analog audio data and outputs it to speaker 502. If holder 100 is a disposable device, then battery 510 would not be replaceable. For reusable embodiments, battery 510 would be replaceable.

Figure 5B:
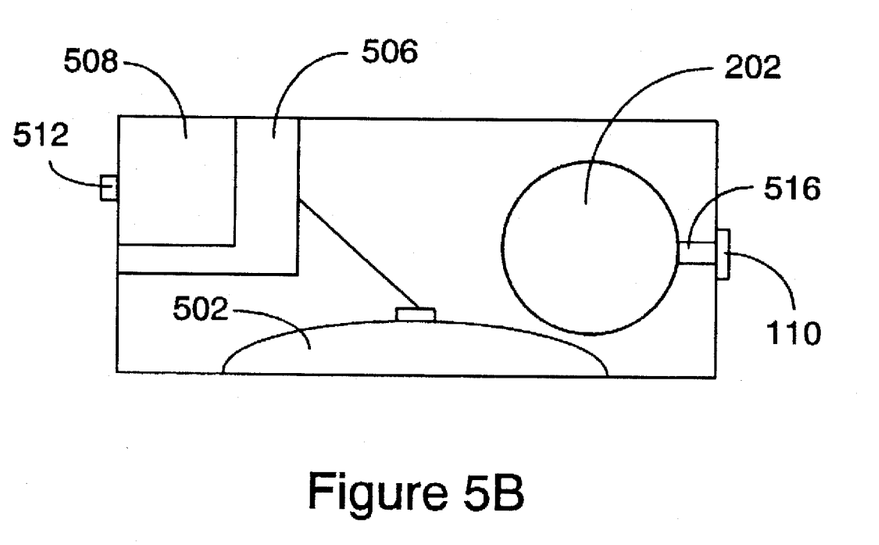
FIG. 5B is a cutaway top view illustrating the electronic components and the lollipop.

FIG. 5B is a top cutaway view of the embodiment of FIG. 5A which shows the relative position of the components of holder 100. While it is important to provide clearance between lollipop 202 and speaker 502 when lollipop 202 is advanced to the extended position, the location of the other components is not critical to operation of the device.

Figure 6:
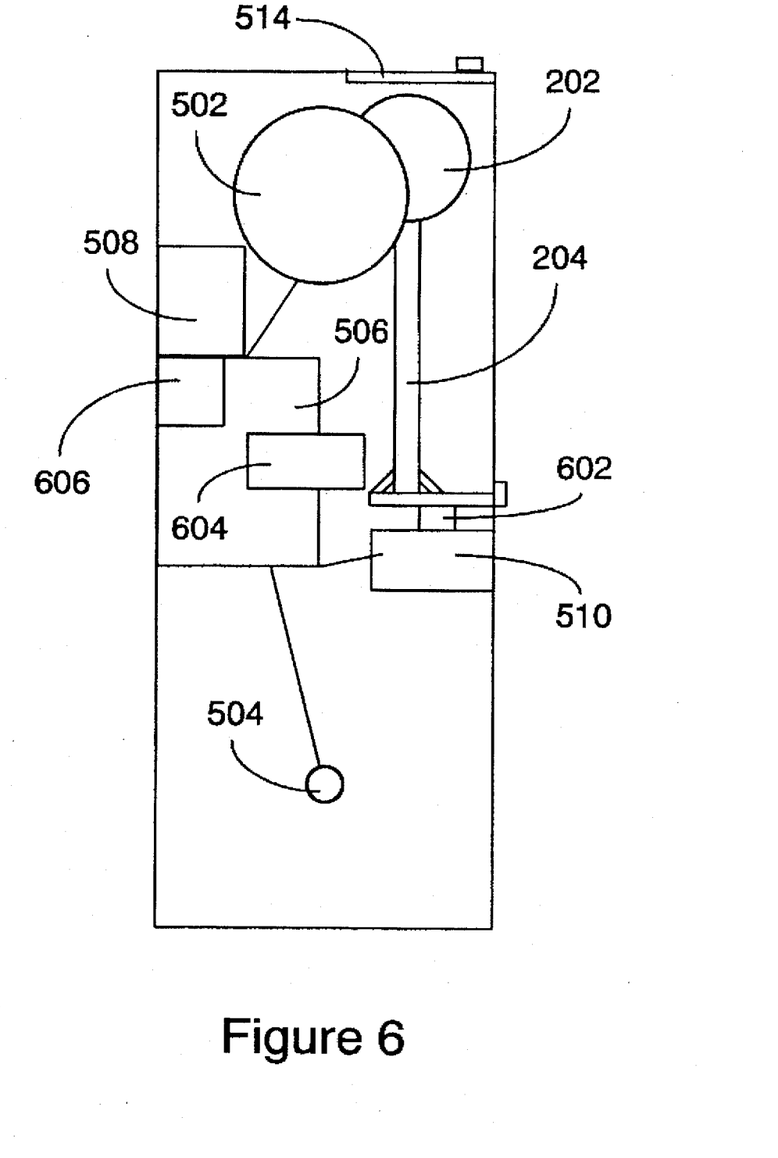
FIG. 6 is a cutaway front view of an alternative embodiment which includes an integral switch that automatically activates the electronic components when the lollipop is extended to the consumption position.

FIG. 6 is an alternative embodiment which eliminates external (or manual) switch 512 and replaces it with spring loaded internal (automatic) switch 602. Spring loaded switches are well known in the art. When lollipop 202 is in the retracted position, switches 602 is automatically placed in the off position by stem support 516. In the on position, optional lamps 604 can be activated to illuminate the keys 116. Lamps can be any conventional technology, such as EL (electroluminescent) lamps, LEDs, etc. In the off position, illumination of holder 100 is turned off. When lollipop 202 is advanced to the extended position, lamp switch 602 is released and is pushed to the on position by its internal spring. When in the on position, holder 100 is illuminated. As a result, whenever the user extends a lollipop for use, holder 100 is automatically illuminated. Automatic switching can be used with any lighting technology such as LED, EL lamps, etc. Lamps 602 are electrically attached to and controlled by audio controller 506 in the preferred embodiment.

In addition to automatic illumination, this embodiment allows use of the audio controller as previously described. Further, while holder 100 can be used for recording and playback of messages as described above, audio controller 506 can also play recorded sounds which are permanently stored in data memory 508 such as the sound of a phone being dialed, the sound of a phone ringing, etc. In addition, audio controller 506 can optionally include a conventional radio receiver to allow the device to be used as a radio as well as a toy telephone. The action can be initiated by internal switch 602, by external switch 512, or by multiple switches, each controlling a different function.

Figure 7:
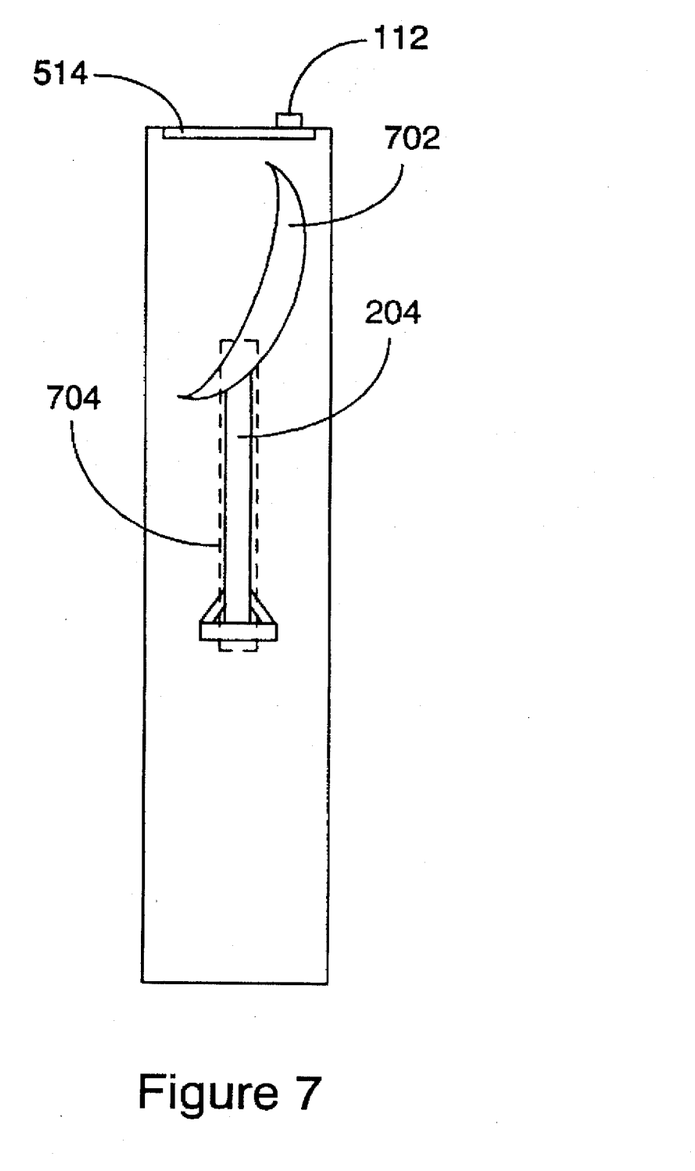
FIG. 7 is a cutaway side view of a preferred embodiment of the device in which the lollipop is formed in the shape of an antenna.

FIG. 7 is a side cutaway view of holder 100 which illustrates a lollipop 702 that is shaped in the form of an antenna. While an antenna is shown in this figure, any shape lollipop can be used so long as it can be moved past cover 112 into the extended position. Dashed line 704 illustrates the track used by slide knob 110.

While the invention has been described with respect to a preferred embodiment thereof, it will be understood by those skilled in the art that various changes in detail may be made therein without departing from the spirit, scope, and teaching of the invention. For example, the material used to construct the device may be anything suitable for holding consumable confections, the size and shape of the holder can vary to suit any lollipop shape, the type of optional lighting and lighting control can vary, the available sounds can include prerecorded sounds as well as sounds recorded by the child, etc. Accordingly, the invention herein disclosed is to be limited only as specified in the following claims.

I claim:

1. A toy telephone and lollipop holder and storage device for use with lollipops, comprising:
   a lollipop;
   a toy telephone, further comprising
      a storage compartment having sufficient room to accept the lollipop;
      at least one retractable securing assembly having means to securely grasp the lollipop; and
      means to move the retractable securing assembly to and from a retracted position where the lollipop is stored within the storage compartment and an extended position where the lollipop extends outside of the storage compartment for consumption;
   an audio controller;
   audio data memory connected to and under control of the audio controller;
   a speaker connected to and under control of the audio controller; and
   a switch connected to the audio controller such that when the switch is activated the audio controller retrieves audio data from the audio data memory and outputs audio data to the speaker.

2. A device, as in claim 1, wherein the storage compartment further comprises a cover to substantially seal the storage compartment when the retractable securing assembly is in the retracted position.

3. A device, as in claim 2, further comprising:
   at least one lamp;
   means to activate the lamp;
   a keypad integrated with a surface of the toy telephone;
   the lamp located inside the toy telephone and positioned such that when illuminated, the keypad is illuminated.

4. A device, as in claim 3, wherein the lamp is an LED.

5. A device, as in claim 3, wherein the lamp is an EL lamp.

6. A device, as in claim 1, further comprising:
   a microphone having an audio output;
   an audio input in the audio controller for inputting audio data from the microphone;
   the audio controller further having means to write audio data input by the microphone into the audio data memory, means to read the audio data from the audio data memory and means to output audio data to the speaker;
   whereby a message can be recorded and played back.

7. A device, as in claim 6, wherein the audio data is input from the microphone, recorded to the audio data memory, read from the audio data memory and output to the speaker when the switch is activated.

8. A device, as in claim 7, wherein the switch is manually activated.

9. A device, as in claim 8, wherein the switch is automatically activated by the retractable securing assembly such that movement of the retractable securing assembly initiates audio recording and playback.

10. A toy telephone and lollipop holder and storage device for use with lollipops, comprising:
    a lollipop;
    a toy telephone, further comprising
       a storage compartment having sufficient room to accept the lollipop;
       at least one retractable securing assembly having means to securely grasp the lollipop; and
       means to move the retractable securing assembly to and from a retracted position where the lollipop is stored within the storage compartment and an extended position where the lollipop extends outside of the storage compartment for consumption;
    a radio receiver;
    a speaker connected to and under control of the radio receiver; and
    a switch connected to the radio receiver such that when the switch is activated the radio receiver outputs audio data to the speaker.

11. A device, as in claim 10, wherein the storage compartment further comprises a cover to substantially seal the storage compartment when the retractable securing assembly is in the retracted position.

12. A device, as in claim 11, further comprising:
    at least one lamp;
    means to activate the lamp;
    a keypad integrated with a surface of the toy telephone;
    the lamp located inside the toy telephone and positioned such that when illuminated, the keypad is illuminated.

13. A device, as in claim 12, wherein the lamp is an LED.

14. A device, as in claim 12, wherein the lamp is an EL lamp.

15. A device, as in claim 11, wherein the switch is manually activated.

16. A device, as in claim 11, wherein the switch is automatically activated by the retractable securing assembly such that movement of the retractable securing assembly initiates activation of the radio.

17. A toy telephone and lollipop holder and storage device for use with lollipops, comprising:

a lollipop;

a toy telephone, further comprising a storage compartment having sufficient room to accept the lollipop;

at least one retractable securing assembly having means to securely grasp the lollipop; and means to move the retractable securing assembly to and from a retracted position where the lollipop is stored within the storage compartment and an extended position where the lollipop extends outside of the storage compartment for consumption;

a cover to substantially seal the storage compartment when the retractable securing assembly is in the retracted position an audio controller;

audio data memory connected to and under control of the audio controller, the audio data memory storing at least one preselected sounds;

a speaker connected to and under control of the audio controller; and a switch connected to the audio controller such that when the switch is activated the audio controller retrieves audio data from the audio data memory and outputs audio data to the speaker.

18. A device, as in claim 17, further comprising:

at least one lamp;

means to activate the lamp;

a keypad integrated with a surface of the toy telephone;

the lamp located inside the toy telephone and positioned such that when illuminated, the keypad is illuminated.

19. A device, as in claim 18, wherein at least one preselected sound is a telephone ringing sound.

20. A device, as in claim 18, wherein at least one preselected sound is a telephone tone dialing sound.

* * * * *